(12) United States Patent
Tsai et al.

(10) Patent No.: US 11,428,480 B2
(45) Date of Patent: Aug. 30, 2022

(54) RADIATOR

(71) Applicant: COOLER MASTER CO., LTD., New Taipei (TW)

(72) Inventors: Shui-Fa Tsai, New Taipei (TW); Hsin-Hung Chen, New Taipei (TW)

(73) Assignee: Cooler Master Co., Ltd., New Taipei (TW)

( * ) Notice: Subject to any disclaimer, the term of this patent is extended or adjusted under 35 U.S.C. 154(b) by 0 days.

(21) Appl. No.: 15/888,088

(22) Filed: Feb. 5, 2018

(65) Prior Publication Data

US 2019/0072342 A1 Mar. 7, 2019

(30) Foreign Application Priority Data

Sep. 5, 2017 (TW) .................. 106213133

(51) Int. Cl.
| | | |
|---|---|---|
| *F28F 9/22* | (2006.01) | |
| *F28F 9/02* | (2006.01) | |
| *F28F 9/00* | (2006.01) | |
| *F28D 21/00* | (2006.01) | |
| *F28D 1/053* | (2006.01) | |
| *F16L 27/08* | (2006.01) | |
| *F16L 37/14* | (2006.01) | |

(52) U.S. Cl.
CPC ............... *F28F 9/22* (2013.01); *F28F 9/001* (2013.01); *F28F 9/0246* (2013.01); *F28F 9/0248* (2013.01); *F16L 27/0845* (2013.01); *F16L 37/144* (2013.01); *F28D 1/05366* (2013.01); *F28D 2021/0031* (2013.01); *F28F 9/0256* (2013.01)

(58) Field of Classification Search
CPC .... F28F 9/22; F28F 9/00; F28F 9/0246; F28F 9/0248; F28F 9/0253; F28F 9/0256; F16L 37/144; F16L 37/142; F16L 37/088; F16L 37/0885; F16L 37/0887; F16L 37/0844; F16L 27/00; F16L 27/02; F16L 27/023
See application file for complete search history.

(56) References Cited

U.S. PATENT DOCUMENTS

| | | | | |
|---|---|---|---|---|
| 3,973,791 | A * | 8/1976 | Porta .................. | F16L 33/2073 285/305 |
| 4,531,574 | A * | 7/1985 | Hoch .................. | F01P 11/08 123/195 A |
| 2005/0081534 | A1* | 4/2005 | Suzuki ................ | F28D 15/00 62/50.2 |
| 2017/0248262 | A1* | 8/2017 | Taniguchi ............ | F16L 37/146 |

FOREIGN PATENT DOCUMENTS

| | | | | |
|---|---|---|---|---|
| EP | 2023027 | A2 * | 2/2009 | ............ F16L 37/144 |
| GB | 2449101 | A * | 11/2008 | ............ F16L 37/30 |

* cited by examiner

*Primary Examiner* — Harry E Arant
(74) *Attorney, Agent, or Firm* — Dickinson Wright PLLC

(57) ABSTRACT

A radiator includes a main body, two connecting members and two taps. The two connecting members are disposed on opposite sides of the main body. Each of the two taps is rotatably connected to one of the two connecting members, such that the two taps are rotatably disposed on opposite sides of the main body.

19 Claims, 3 Drawing Sheets

RADIATOR

BACKGROUND OF THE INVENTION

1. Field of the Invention

The invention relates to a radiator and, more particularly, to a radiator with two taps rotatably disposed on opposite sides.

2. Description of the Prior Art

A heat dissipating device is a significant component for electronic devices. When an electronic device is operating, the current in the circuit will generate unnecessary heat due to impedance. If the heat accumulates in the electronic components of the electronic device without dissipating immediately, the electronic components may be damaged due to the accumulated heat. Therefore, the performance of a heat dissipating device is a significant issue for electronic devices.

A heat dissipating device used in an electronic device usually consists of a heat pipe, a heat dissipating fin and a fan, wherein an end of the heat pipe contacts the electronic component, which generates heat during operation, another end of the heat pipe is connected to the heat dissipating fin, and the fan blows air to the heat dissipating fin, so as to dissipate heat. However, the fan may generate noise and consume high power under high speed, and the aforesaid problems are difficult to be solved by the manufacturer. Accordingly, a liquid cooling system has been developed.

In general, a liquid cooling system essentially consists of a liquid cooling head, a radiator and a pump. When the liquid cooling system is dissipating heat from an electronic component, the pump transports a cooling liquid to the liquid cooling head, the cooling liquid absorbs the heat generated by the electronic component, and then the radiator cools the cooling liquid. Therefore, the radiator is very important for the liquid cooling system. The radiator has two taps for transporting a cooling liquid, wherein the two taps are disposed on an identical side of the conventional radiator and cannot rotate. When the conventional radiator is installed in an electronic device, the positions of tubes connected to the taps cannot be adjusted according to the arrangements of electronic components in the electronic device. Accordingly, the radiator has to be customized for different electronic devices, such that the radiator is not flexible in use and the manufacturing cost may increase.

SUMMARY OF THE INVENTION

The invention provides a radiator with two taps rotatably disposed on opposite sides, so as to solve the aforesaid problems.

According to an embodiment of the invention, a radiator comprises a main body, two connecting members and two taps. The two connecting members are disposed on opposite sides of the main body. Each of the two taps is rotatably connected to one of the two connecting members, such that the two taps are rotatably disposed on opposite sides of the main body.

As mentioned in the above, since the two taps are rotatably disposed on opposite sides of the main body of the radiator, a user or a manufacturer can adjust the positions of tubes connected to the taps according to the arrangement of electronic components in an electronic device, so as to prevent the tubes connected to the taps from interfering with the electronic components in the electronic device. Accordingly, the radiator of the invention can be applied to various electronic devices.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
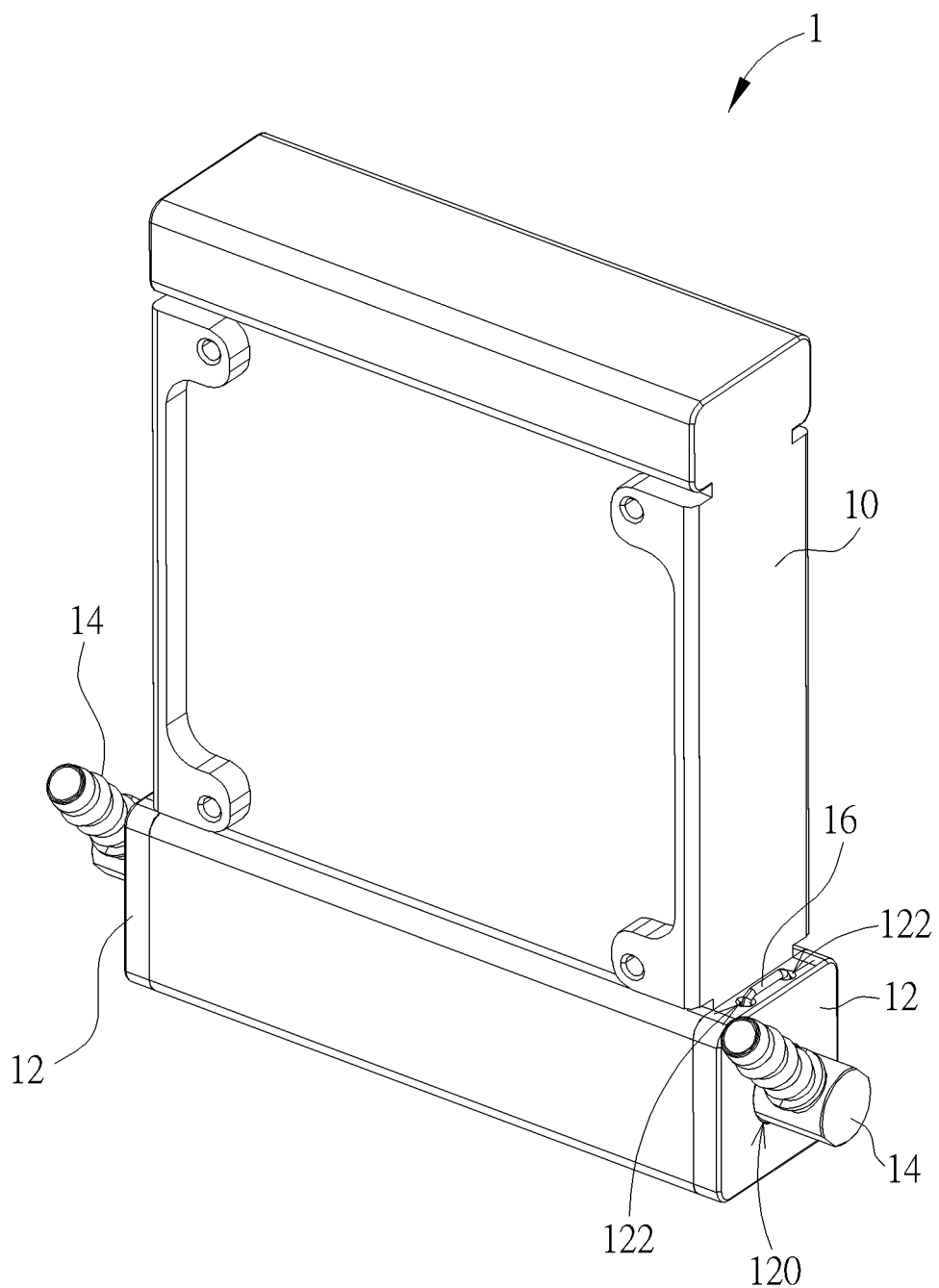
FIG. 1 is a schematic view illustrating a radiator according to an embodiment of the invention.
Figure 2:
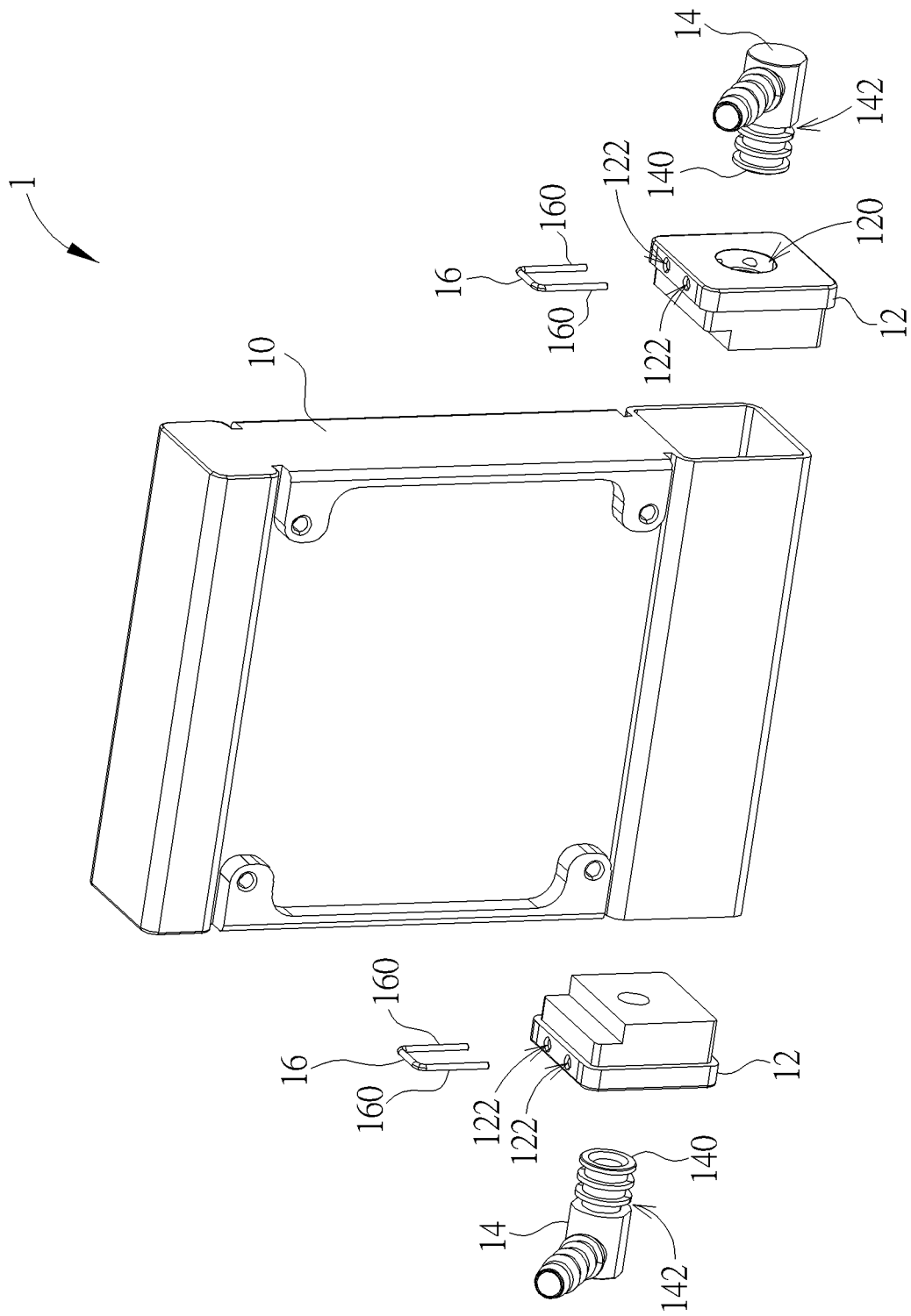
FIG. 2 is an exploded view illustrating the radiator shown in FIG. 1.
Figure 3:
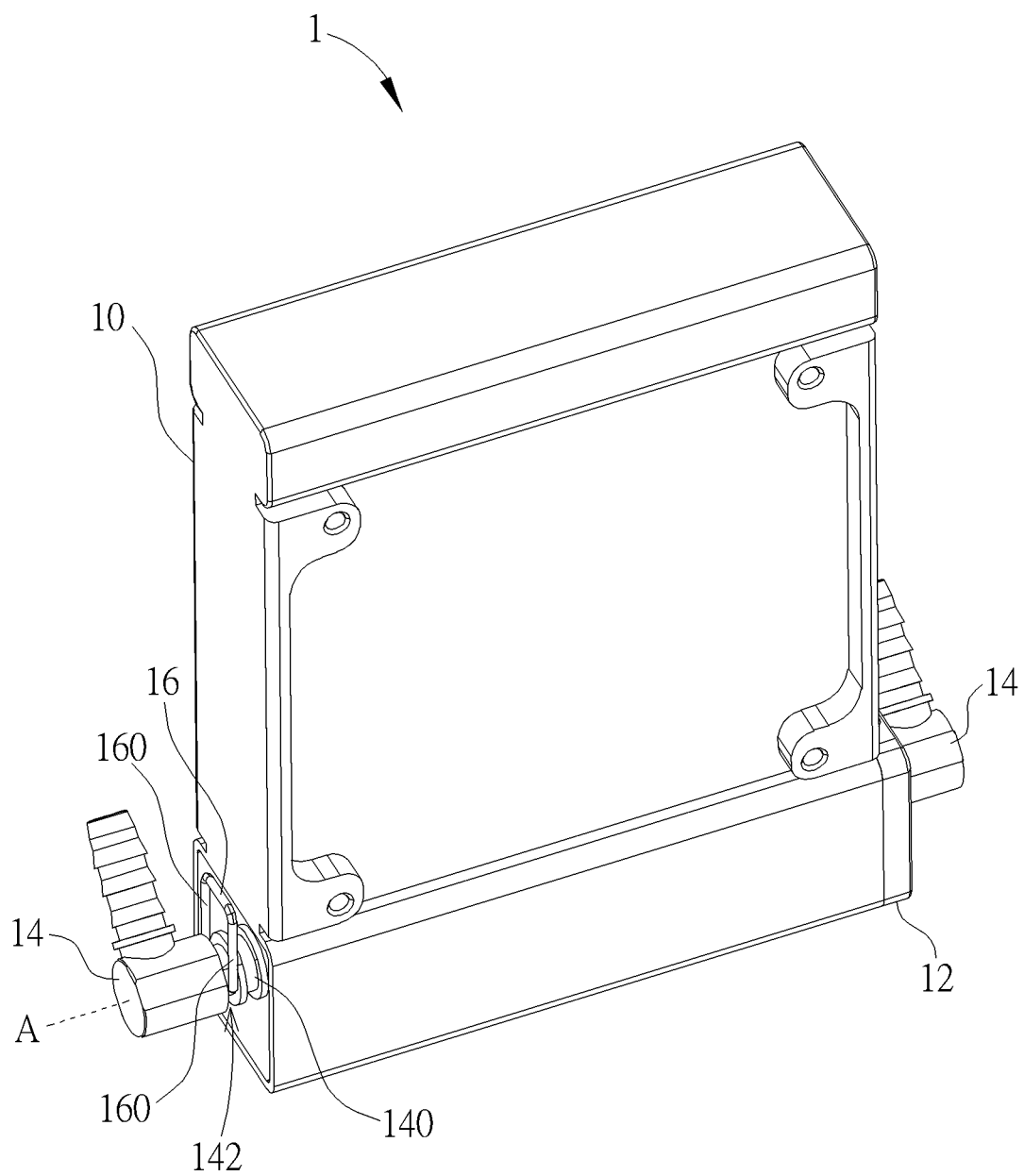
FIG. 3 is a schematic view illustrating the radiator shown in FIG. 1 after removing the connecting member from one side.

Referring to FIGS. 1 to 3, FIG. 1 is a schematic view illustrating a radiator 1 according to an embodiment of the invention, FIG. 2 is an exploded view illustrating the radiator 1 shown in FIG. 1, and FIG. 3 is a schematic view illustrating the radiator 1 shown in FIG. 1 after removing the connecting member 12 from one side.

As shown in FIGS. 1 to 3, the radiator 1 comprises a main body 10, two connecting members 12, two taps 14 and two U-shaped pins 16. The two connecting members 12 are disposed on opposite sides of the main body 10. In this embodiment, the two connecting members 12 may be welded on opposite sides of the main body 10, such that the main body 10 and the two connecting members 12 are formed integrally. Each of the two taps 14 is rotatably connected to one of the two connecting members 12, such that the two taps 14 are rotatably disposed on opposite sides of the main body 10.

In this embodiment, each of the two connecting members 12 may have a first hole 120 and two second holes 122, wherein the first hole 120 and the two second holes 122 are formed on two adjacent sides of the connecting member 12. To assemble the radiator 1, a first end 140 of the tap 14 is inserted into the first hole 120 and two second ends 160 of the U-shaped pin 16 are inserted into the two second holes 122, such that the first end 140 of the tap 14 is rotatably sandwiched in between the two second ends 160 of the U-shaped pin 16.

In this embodiment, the first end 140 of the tap 14 may have a ring-shaped recess 142. As shown in FIG. 3, when the first end 140 of the tap 14 is sandwiched in between the two second ends 160 of the U-shaped pin 16, the two second ends 160 of the U-shaped pin 16 are located in the ring-shaped recess 142.

In this embodiment, the tap 14 has an axial direction A and the tap 14 can rotate about the axial direction A with respect to the main body 10 of the radiator 1. When the tap 14 rotates, the U-shaped pin 16 can prevent the tap 14 from coming off the connecting member 12 along the axial direction A.

As mentioned in the above, since the two taps are rotatably disposed on opposite sides of the main body of the radiator, a user or a manufacturer can adjust the positions of tubes connected to the taps according to the arrangement of electronic components in an electronic device, so as to prevent the tubes connected to the taps from interfering with the electronic components in the electronic device. Accordingly, the radiator of the invention can be applied to various electronic devices.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A radiator comprising:
   a main body configured in an electronic device with respect to electronic components disposed in the electronic device;
   a first connecting member disposed on a first surface of the main body, the first surface facing in a first direction, the first connecting member extending at least partially into the main body;
   a second connecting member disposed on a second surface of the main body, the second surface facing in a second direction, the second connecting member extending at least partially into the main body;
   a first tap comprising a first end rotatably connected to the first connecting member, and a second end configured to connect to a first tube transporting a cooling liquid, the second end having a second axis; and
   a second tap comprising a third end rotatably connected to the second connecting member, and a fourth end configured to connect to a second tube transporting the cooling liquid, the fourth end having a fourth axis,
   wherein
   the second direction is different from the fist direction, such that the first tap and the second tap are rotatably disposed on the respective first surface and second surface of the main body facing in different directions, and each tap is independently rotatable with respect to the main body, such that the second axis and the fourth axis do not intersect to prevent the first and second tubes connected to the first tap and the second tap, respectively, from interfering with the electronic components in the electronic device.

2. The radiator of claim 1, wherein the main body and the at least one of the first connecting member and the second connecting member is formed integrally.

3. The radiator of claim 1, wherein at least one of the first tap and the second tap is retained with respect to the at least one of the first connecting member and the second connecting member in an axial direction, respectively.

4. The radiator of claim 3, further comprising at least one pin,
   at least one of the first connecting member and the second connecting member having a main hole and at least a first secondary hole,
   the main hole and the first secondary hole being formed on two adjacent sides of the at least one of the first connecting member and second connecting member,
   a first end of at least one of the first tap and the second tap being inserted into the main hole and a first end of the at least one pin being inserted into the first secondary hole, such that the first end of the at least one of the first tap and the second tap is axially retained in the first connecting member.

5. The radiator of claim 4, wherein when the at least one of the first tap and the second tap rotates about the axial direction with respect to the main body, the at least one pin prevents the at least one of the first tap and the second tap from coming off the at least one of the first connecting member and the second connecting member, respectively, along the axial direction.

6. The radiator of claim 4, wherein the at least one pin is a U-shaped pin comprising the first end of the at least one pin and a second end,
   the at least one of the first connecting member and the second connecting member having a second secondary hole formed on the same side the first secondary hole,
   the first end the U-shaped pin being inserted into the first secondary hole and the second end of the U-shaped pin being inserted into the second secondary hole, such that the first end of the at least one of the first tap and the second tap is rotatably sandwiched in between the first secondary end and the second secondary end of the U-shaped pin.

7. The radiator of claim 6, wherein the first end of the at least one of the first tap and the second tap has a ring-shaped recess and the first secondary end and the second secondary end of the U-shaped pin are located in the ring-shaped recess.

8. The radiator of claim 3, wherein the at least one of the first tap and the second tap rotates about the axial direction with respect to the main body.

9. The radiator of claim 1, wherein at least one of the first tap and the second tap is removably attached to the at least one of the first connecting member and the second connecting member, respectively.

10. The radiator of claim 1, wherein at least one of the first tap and the second tap is axially fixed to the at least one of the first connecting member and the second connecting member, respectively.

11. The radiator of claim 1, wherein the first direction is essentially opposite to the second direction.

12. The radiator of claim 1, wherein at least one of the first end of the first tap has a first axis, and
    the third end of the second tap has a third axis.

13. The radiator of claim 12, wherein at least one of
    the first axis of the first end is not parallel to the second axis of the second end of the of the first tap, and
    the third axis of the third end is not parallel to the fourth axis of the fourth end of the of the second tap.

14. The radiator of claim 13, wherein at least one of
    the first axis of the first end and the second axis of the second end of the first tap are essentially perpendicular, and
    the third axis of the third end and the fourth axis of the fourth end of the second tap are essentially perpendicular.

15. The radiator of claim 1, wherein:
    the first end of the first tap has a first axis extending in the second direction, and
    the third end of the second tap has a third axis extending in the first direction.

16. The radiator of claim 15, wherein
    the first axis of the first tap is not parallel to the second axis of the first tap, and
    the third axis of the second tap is not parallel to the fourth axis of the second tap.

17. The radiator of claim 15, wherein
    the first direction is opposite to the second direction,
    the first axis of the first tap is perpendicular to the second axis of the first tap, and
    the third axis of the second tap is perpendicular to the fourth axis of the second tap, whereby a plane of rotation of the second axis of the first tap and a plane of rotation of the third axis of the second tap do not intersect.

18. The radiator of claim 1, wherein:

the first connecting member allows continuous unimpeded liquid flow therethrough when connected to the first tap and when disconnected from the first tap; and the second connecting member allows continuous unimpeded liquid flow therethrough when connected to the second tap and when disconnected from the second tap.

19. The radiator of claim 1, wherein the first tap allows continuous unimpeded liquid flow therethrough when connected to the first connecting member and when disconnected from the first connecting member; and the second tap allows continuous unimpeded liquid flow therethrough when connected to the second connecting member and when disconnected from the first connecting member.

* * * * *